(12) United States Patent
Craig et al.

(10) Patent No.: US 7,703,660 B2
(45) Date of Patent: Apr. 27, 2010

(54) METHOD AND SYSTEM FOR WELD BEAD SEQUENCING TO REDUCE DISTORTION AND STRESS

(75) Inventors: Edward Craig, Asheville, NC (US); Anthony Scandroli, Cumming, GA (US); Pedro E. Amador, Lawrenceville, GA (US); Patrick J. Dimaggio, Buford, GA (US)

(73) Assignee: Aquilex Corp., Atlanta, GA (US)

( * ) Notice: Subject to any disclaimer, the term of this patent is extended or adjusted under 35 U.S.C. 154(b) by 299 days.

(21) Appl. No.: 11/556,963

(22) Filed: Nov. 6, 2006

(65) Prior Publication Data

US 2007/0181643 A1 Aug. 9, 2007

(51) Int. Cl.
*B23K 31/02* (2006.01)
(52) U.S. Cl. .................. 228/119; 29/890.031; 219/61
(58) Field of Classification Search ............... 228/256, 228/225, 119; 219/61, 76.15; 61/130, 76.14; 29/890.031
See application file for complete search history.

(56) References Cited

U.S. PATENT DOCUMENTS

| | | | |
|---|---|---|---|
| 1,810,902 | A | 6/1931 | Burnish |
| 3,008,037 | A | 11/1961 | Harmes |
| 3,209,119 | A | 9/1965 | Keidel et al. |
| 3,268,248 | A | 8/1966 | Chambers |
| 3,515,844 | A | 6/1970 | Colarossi et al. |
| 3,598,347 | A | 8/1971 | Marburger |
| 3,611,541 | A | 10/1971 | Garrett |
| 3,727,025 | A | 4/1973 | Dibenedetto |
| 3,990,892 | A | 11/1976 | Machi et al. |
| 4,015,100 | A | 3/1977 | Gnanamuthu et al. |
| 4,114,992 | A | 9/1978 | Kimura |
| 4,179,059 | A | 12/1979 | Chang et al. |

(Continued)

FOREIGN PATENT DOCUMENTS

EP 0484125 A2 5/1992

(Continued)

OTHER PUBLICATIONS

Michaleris Y. P; Dantzig J.; Tortorelli D., Minimization of Welding Residual Stess and Distortion in Large Structures, 1999, American Welding Society, Welding Journal, vol. 78, pp. 361-366.*

(Continued)

*Primary Examiner*—Jessica L Ward
*Assistant Examiner*—Nicholas P D'Aniello
(74) *Attorney, Agent, or Firm*—Greenberg Traurig, LLP; Jason P. Sander (57) ABSTRACT

In one embodiment, the present invention relates to a method and system of determining the weld bead sequence on a mechanical component is disclosed. In one specific embodiment, the sequence is determined by numerical analysis of a plurality of weld bead sequences to determine the weld bead sequence. Then, after this sequence is determined, a weld overlay is placed onto the mechanical component using the sequence. In particular embodiments, a weld bead sequence is applied to a boiler tube panel wherein the sequence begins at the crown of the tube, progresses down the walls of the tube to the tube and membrane interface, and concludes on the membrane. The new bead sequence reduces residual and distortional stresses as created by applying a weld overlay.

7 Claims, 6 Drawing Sheets

U.S. PATENT DOCUMENTS

| | | | |
|---|---|---|---|
| 4,260,870 A | 4/1981 | Sekino et al. | |
| 4,346,808 A | 8/1982 | Garlung et al. | |
| 4,372,474 A | 2/1983 | Taff | |
| 4,373,125 A | 2/1983 | Kazlauskas | |
| 4,429,497 A | 2/1984 | Dibernardi | |
| 4,495,400 A | 1/1985 | Thompson | |
| 4,593,849 A | 6/1986 | Doering | |
| 4,624,402 A * | 11/1986 | Pitcairn et al. | 228/119 |
| 4,782,206 A | 11/1988 | Ayres et al. | |
| 4,841,115 A | 6/1989 | Severin et al. | |
| 4,948,936 A | 8/1990 | Landry | |
| 5,014,901 A * | 5/1991 | Moran | 228/119 |
| 5,227,601 A | 7/1993 | Black | |
| 5,456,946 A | 10/1995 | Snellman | |
| 6,013,890 A | 1/2000 | Hulsizer | |
| 6,204,477 B1 | 3/2001 | Lai | |
| 6,175,093 B1 | 6/2001 | Cauthon et al. | |
| 6,548,783 B1 | 4/2003 | Kilovsky et al. | |
| 6,595,402 B2 | 7/2003 | Nakamura et al. | |
| 6,727,465 B1 | 4/2004 | Kislovsky et al. | |
| 7,028,882 B2 * | 4/2006 | Kislovsky et al. | 228/256 |
| 7,560,662 B2 | 7/2009 | Amador et al. | |
| 2006/0081740 A1 | 4/2006 | Bellavance | |
| 2006/0191874 A1 | 8/2006 | Holdren | |
| 2007/0297556 A1 | 12/2007 | Spence et al. | |
| 2008/0035620 A1 | 2/2008 | Amador et al. | |
| 2008/0230155 A1 | 9/2008 | Lai | |
| 2009/0224530 A1 | 9/2009 | Sessions | |
| 2009/0230109 A1 | 9/2009 | Amador et al. | |
| 2009/0250437 A1 | 10/2009 | King et al. | |

FOREIGN PATENT DOCUMENTS

| | | |
|---|---|---|
| EP | 2098324 A1 | 9/2009 |
| EP | 2106872 A1 | 10/2009 |
| GB | 684631 A | 12/1952 |
| JP | 55016743 A | 2/1980 |
| JP | 6015076 | 1/1985 |
| JP | 63103050 | 5/1988 |
| WO | WO 2008/057075 A1 | 5/2008 |

OTHER PUBLICATIONS

Patent Cooperation Treaty's International Search Report for International Application No. PCT/US06/43213.

Patent Cooperation Treaty's Written Opinion of the International Searching Authority for International Application No. PCT/US06/043213.

European Search Report for European Patent Application No. 09154559.

European Search Report for European Patent Application No. 09157447.

European Patent Office's Patent Abstracts for Japan Patent Application No. 58123639.

* cited by examiner

METHOD AND SYSTEM FOR WELD BEAD SEQUENCING TO REDUCE DISTORTION AND STRESS

BACKGROUND

1. Field

The present disclosure relates to a new method and system for the sequencing of weld beads. In one embodiment, the present disclosure relates to utilizing a numerical analysis to determine a weld bead sequence that may reduce distortion and/or stress caused by the welding process.

2. General Background

When selecting a metal for a particular application, the demands of the application may require physical characteristics which cannot be met by a single composition. Some alloys, for example, may provide suitable characteristics in terms of mechanical properties but lack the necessary physical characteristics such as resistance to corrosion or erosion.

In such an instance, one solution is typically found in overlaying a metal having the requisite structural characteristics with an alloy or another metal having the desired physical characteristics by welding and other similar processes.

Welding has both positive and negative effects on the properties of base metals being joined and the previously deposited metal. In many welding processes, weld beads are placed at specific locations in or at the surface of the weld for the purpose of affecting the metallurgical properties of the heat-affected zone or previously deposited weld metal.

The application of a layer of weld beads to cover a surface, may cause residual stress as a result of the welding process. The heat input causes melting and re-solidification of the applied metal. As a result, residual stresses may result in physical distortion of the surface or the geometry of the component.

Typically, allowances are made in the dimensions of the component to allow for dimensional changes after the application of the overlay. However, this is an inexact science and dimensional changes have been very difficult to predict or calculate except in cases of very regular parts.

In other cases, components may be constructed oversized and following application of overlay, cut to specified size.

Distortion of components can sometimes be resolved with mechanical straightening and stress relieving heat treatments. However, this approach may only be effective in resolving some simple dimensional distortions such as flatness. In most cases there are no practical methods of returning a large, complex component, for example, a boiler tube panel, to its original size and specification.

Efforts to date have focused on minimizing the effects of weld overlay application. For example, various methods have been utilized to try and reduce the stress of applying a weld overlay on boiler tube panels. This includes running water through the tubes during the weld overlay process to minimize the heat buildup and accelerate the cooling of the weld overlay. Further, efforts have also been made to precisely manage the input parameters of the weld process to minimize the heat input.

SUMMARY

In one aspect of the present disclosure, a method to reduce the stress and distortion caused by placing a weld bead in a particular sequence on a metal component is disclosed. In one embodiment, a sequence is determined by numerical analysis of a plurality of weld bead sequences to determine a weld bead sequence. Then, after this sequence is determined, a weld overlay is placed onto the mechanical component using the determined sequence.

In another aspect, a method is disclosed wherein a weld bead sequence is determined for applying a weld overlay to a membrane connected boiler tube panel. In this method, the weld bead sequence begins at the crown of the tube, proceeds down the walls of the tube alternating parallel to the tube center line until reaching the tube and membrane interface, and concludes by applying weld beads on the membrane on each side of the tube.

In a particular embodiment, the method comprises applying a first weld bead at the crown of a wall of a boiler tube at a first location, then applying a second weld bead at the crown of the wall of the boiler tube at a second location parallel to the first location on the opposite side of the tube center line axis, and then applying a third weld bead at the cap of the boiler tube. A plurality of weld beads beginning with applying an additional weld bead next to the first location will then be applied, alternating parallel to the tube center line axis to apply another weld bead, and continuing to alternate and place more weld beads when moving down the tube wall to the membrane and tube wall interface, and applying subsequent weld beads on the membrane.

In exemplary embodiments, the residual and distortional stress placed on the mechanical component is reduced by using the weld bead sequence as disclosed herein. Accordingly, in one example, the mechanical component maintains its shape better and the process becomes more efficient.

In another aspect of the disclosed method, a mechanical component is prepared that has a weld overlay with a substantially uniform and consistent thickness across the surface of the weld overlay. In particular embodiments, the weld overlay application has a thickness that is substantially uniform and a substantially consistent thickness throughout the covered surfaces which more uniformly distributes stresses and minimizes the potential for "stress risers" where surface defects or fatigue sites can become corrosion sites or cracks.

DRAWINGS

The foregoing aspects and advantages of the present disclosure will become more readily apparent and understood with reference to the following detailed description, when taken in conjunction with the accompanying drawings, wherein.

DETAILED DESCRIPTION

In one implementation of the present disclosure, a method is disclosed to reduce stress and distortion upon placement of a weld overlay on a mechanical component. The method entails placing weld beads at a particular location on the mechanical component.

In another embodiment, utilizing a numerical analysis (e.g. utilizing a computer model), an application process and technique is disclosed in which the method reduces the distortion of metals when weld overlay is applied. In one example, the process involves placing a weld bead at specific locations in a specific sequence. This sequence may be determined by calculating the residual stress and distortional stress caused by placement of a plurality of weld bead sequences on the mechanical component; determining a weld bead sequence based on the amount of residual and distortional stress caused by the plurality of weld bead sequences; and applying the weld bead sequence to the mechanical component to place a weld overlay on the mechanical component.

In one example of a specific embodiment of the present invention, to simulate a weld process, a two-dimensional nonlinear finite element analysis was performed in the plane perpendicular to the weld direction. Thermal and mechanical analyses were uncoupled and performed in two separate runs. First, the thermal analysis was performed calculating the transient temperature distributions during welding. The model for the mechanical analysis was similar to the thermal one, except for the type of finite elements and applied boundary conditions. The mechanical part relied on the thermal analysis results and calculated the stress-strain distribution on the basis of the transient temperature gradients. Three computational steps were required to complete one welding pass. In the first, the heat source passed across an observed section and heated/melted the base material. The weld material was added in the second step. The third step, which was required because of generalized plane strain model assumptions, simulated the cooling of the observed section before the electrode returned for the next welding pass. A final cooling took place after the final pass was finished and lasted until the tube panel reached the isothermal ambient temperature.

Figure 2:
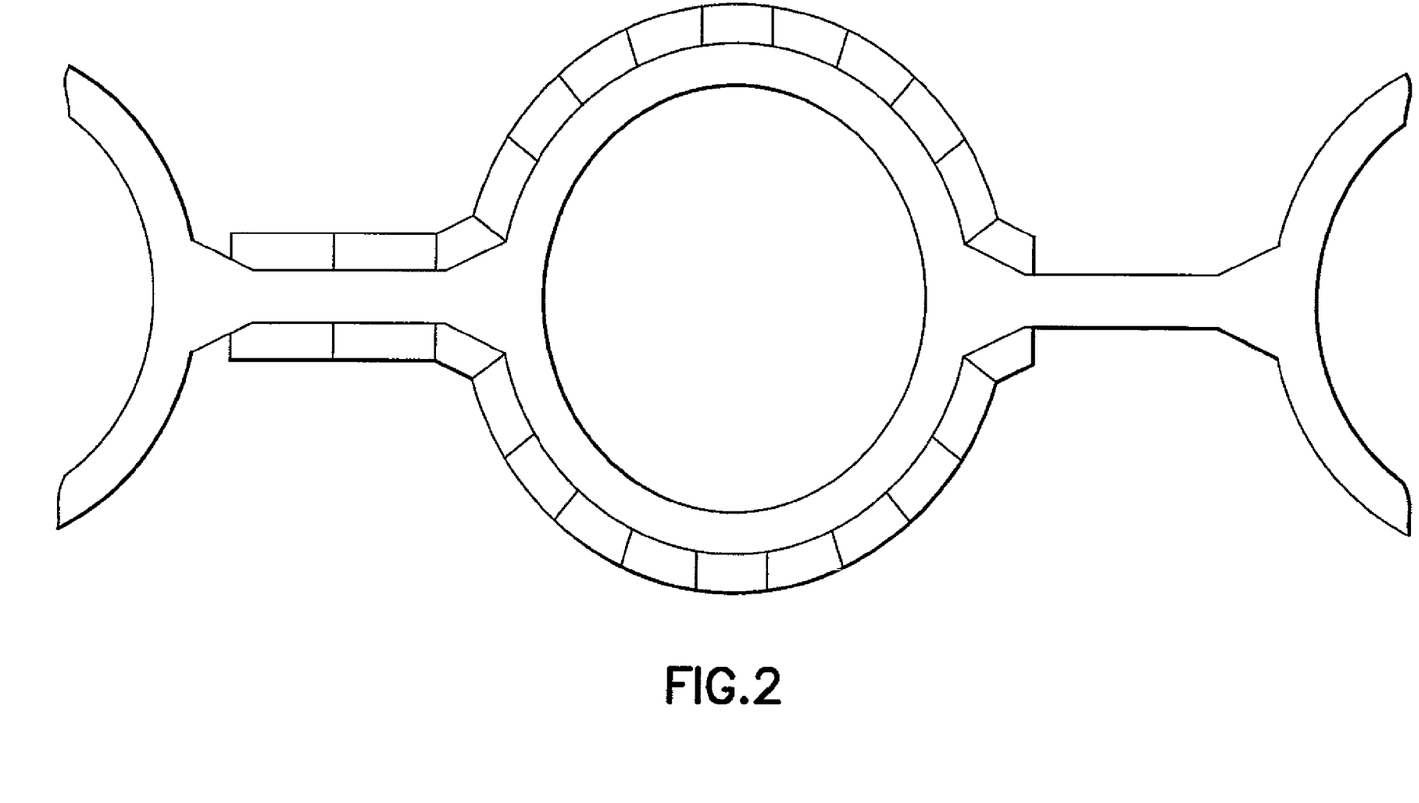
FIGS. 2 and 3 illustrate, respectively, residual and distortional stresses present in boiler tube membrane panels constructed using a conventional approach to the placement and sequence of welds, and an embodiment of the presently disclosed and claimed placement and sequence of welds. One consequence of differing stresses, both distribution and magnitude, of stresses is seen in the difference in the shape of the tubes and membranes constructed using the different bead sequence approaches.
Figure 3:
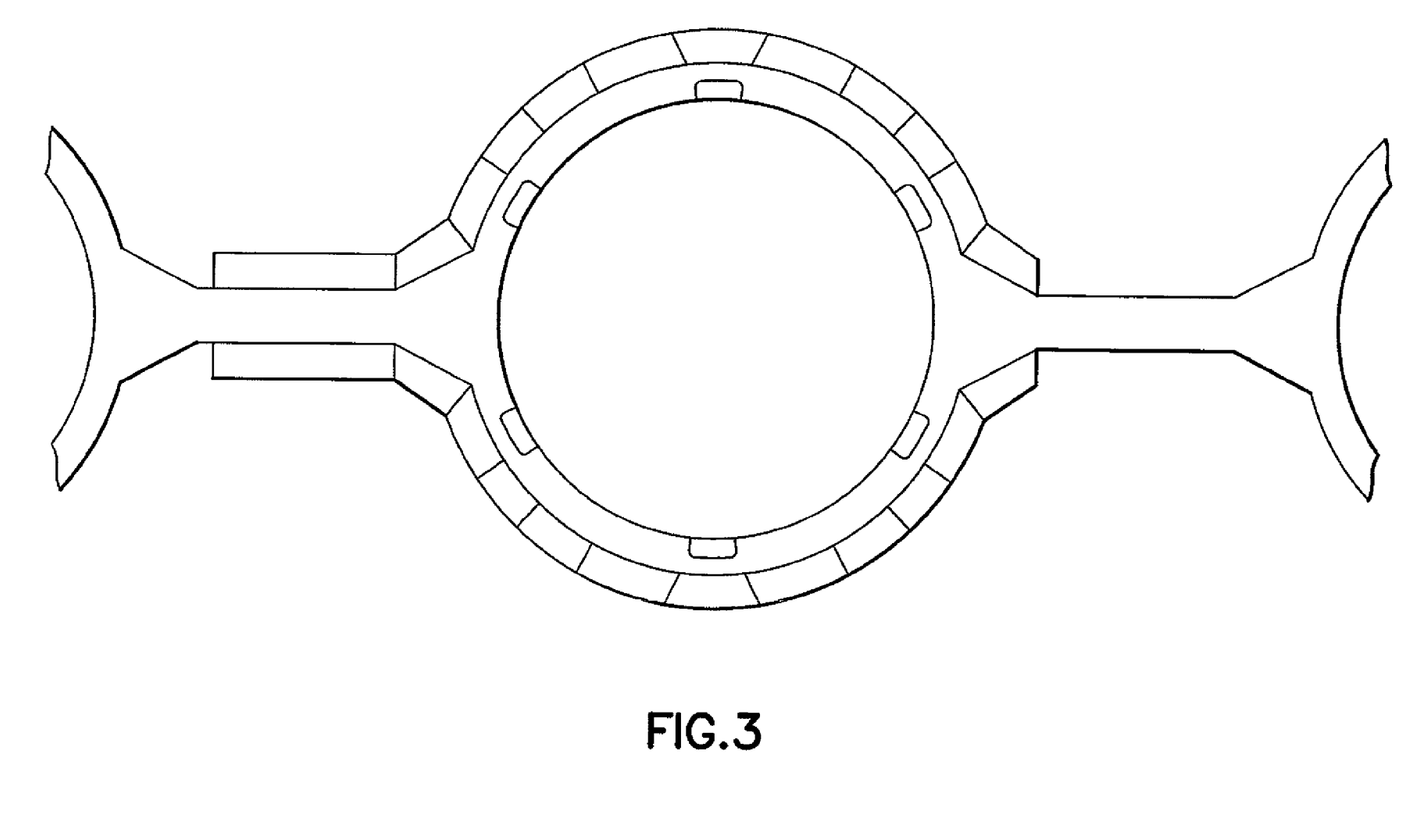

FIGS. 2 and 3 show a comparison between a conventional placement/sequence vs. the placement/sequence of an embodiment of the present invention. The conventional (see FIG. 2) application weld bead sequence produced a distorted tube which was oval rather than circular. The ovality of the tube translates into reduced width dimension of the boiler tube membrane panel. Both the ovality of the tube and the reduced width dimension of the boiler tube membrane panel are undesirable characteristics of the conventional method. This sequence was analyzed using the developed methodology just described. The analysis model accurately predicted the resulting distortion and ovality of the tube of FIG. 2. The placement/sequence of an embodiment of the present invention (see FIG. 3) produced a tube which was circular rather than oval. This sequence was also analyzed using the developed methodology just described. The analysis model also predicted the resulting distortion and relative circularity of the tube of FIG. 3.

Figure 4:
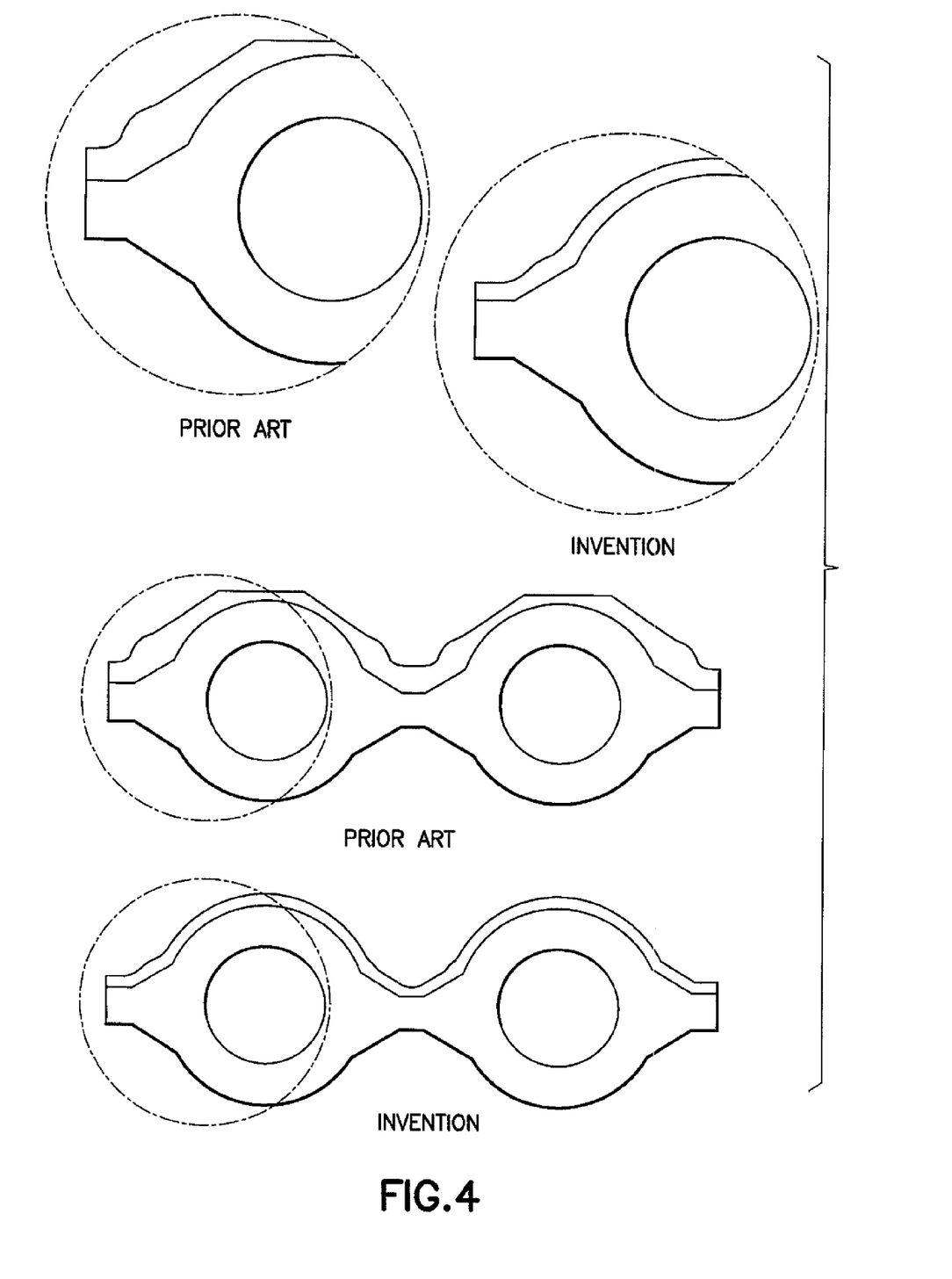
FIG. 4 illustrates a photographic comparison of the relative thickness of the walls resulting from the conventional weld placement/sequence and the weld placement/sequence of the present invention FIGS. 5 and 6 provide data from numerical analysis indicating the stress-induced changes on the geometry of the tube in a tube panel when overlay is applied with the conventional method ("old weld sequence") compared to one embodiment of the present ("new weld sequence") invention

FIG. 4 shows a photographic comparison of the relative thickness of the walls resulting from the conventional placement/sequence ("old method") and the placement/sequence of the present invention ("new method"). As compared with the conventional application weld bead sequence, the process of the present invention created a product with much greater uniformity of wall thickness throughout the tube and membrane surfaces.

Figure 5:
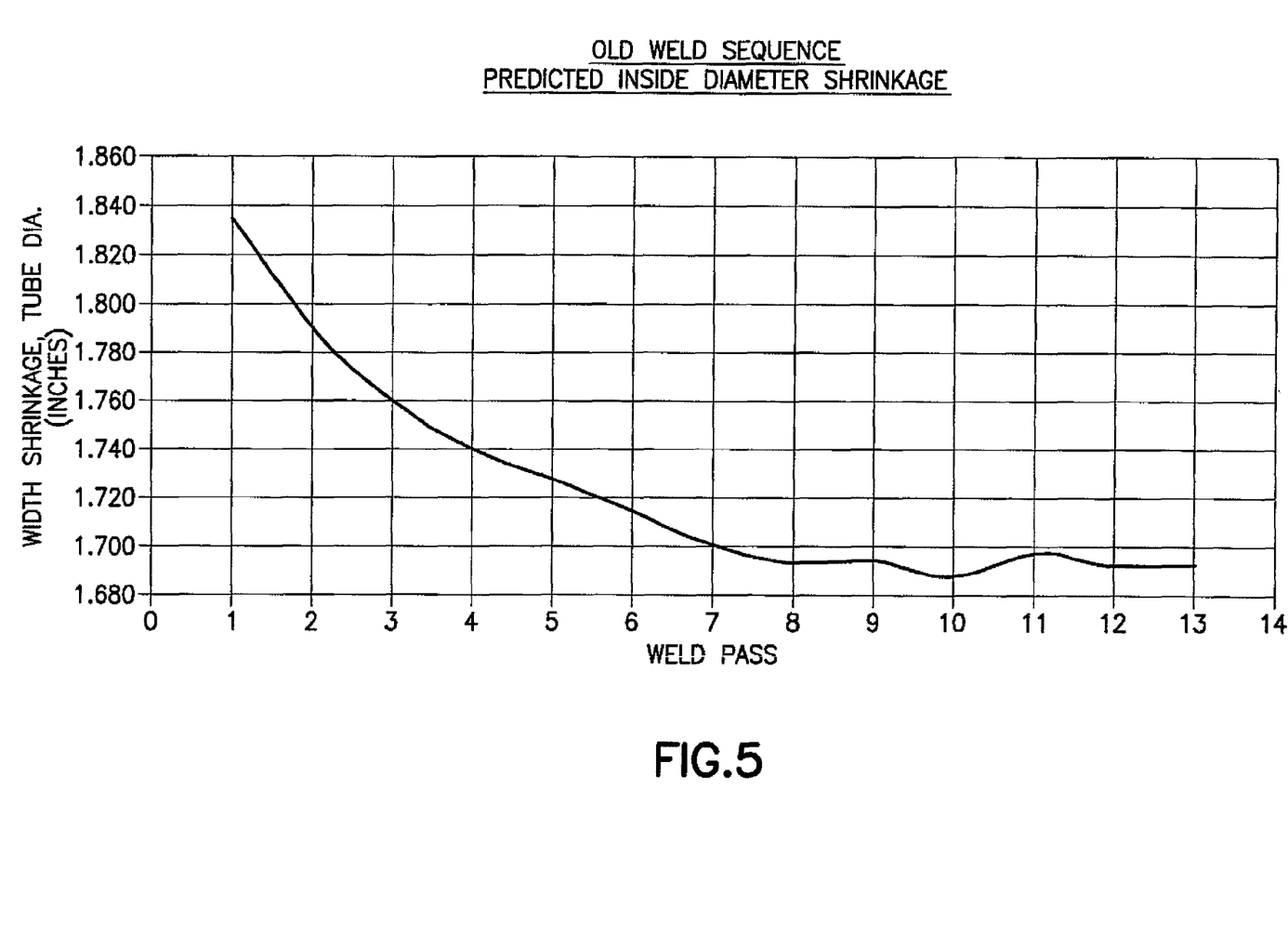
Figure 6:
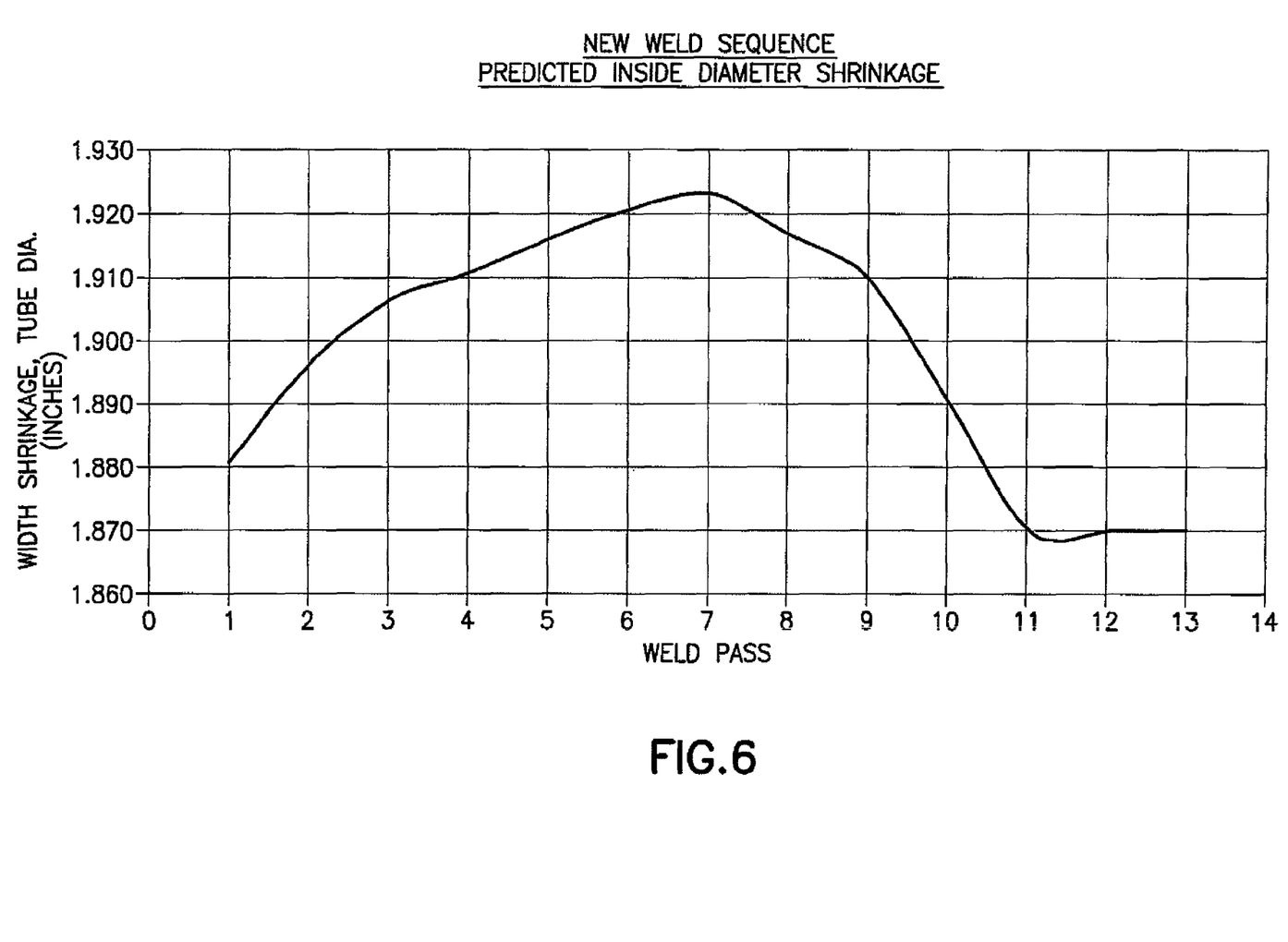

FIGS. 5 and 6 provide data from numerical analysis indicating the stress-induced changes on the geometry of the tube in a tube panel when overlay is applied with the conventional method compared to one embodiment of the present invention.

In one embodiment, various application placements and sequences were then explored using the numerical model of the present invention to deduce a sequence which would minimize the tube distortion. In one example, the placement technique and sequence predicted a minimum of distortion and is represented in FIG. 3. This placement technique and sequence was transferred to field production trials which confirmed the preservation of tube circularity just as predicted. The placement technique and sequence also resulted in additional "as-deposited" features which produce performance benefits beyond the benefits of the maintenance of the original geometry of the tube. These benefits included a maximized beneficial chemistry of the as-deposited crown bead for best corrosion and crack resistance, and a more uniform, consistent thickness of overlay through out the covered surfaces which more uniformly distributes stresses and minimizes the potential for "stress risers" where surface defects or fatigue sites can become corrosion sites or cracks.

In particular embodiments, a method to reduce residual stress and distortion by placing a weld bead sequence in a particular pattern on tubes and tube panels when weld overlay is applied is disclosed. As shown, e.g. in FIG. 4, the thickness of the weld overlay application is measurably more consistent and uniform across the curved-flat-curved surface of a tube panel.

Figure 1:
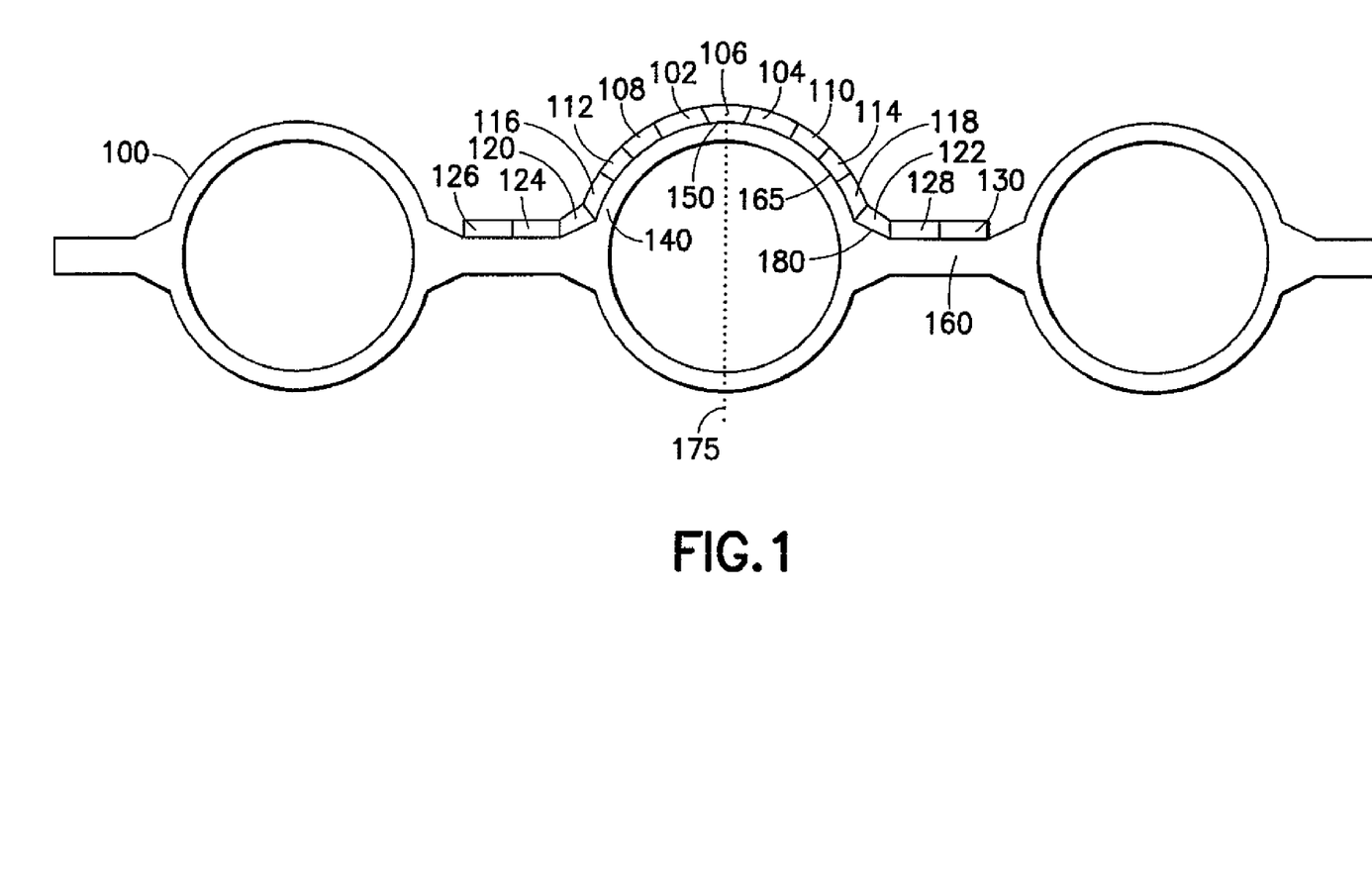
FIG. 1 illustrates an exemplary method of applying a sequencing technique for a particular embodiment in accordance with the present disclosure.

FIG. 1 illustrates an exemplary implementation of the method of weld bead sequencing to eliminate the stress and distortion of applying a weld overlay to a boiler tube panel 100. In this implementation, weld bead placement and sequence was analyzed to determine the placement and sequence of weld beads on membrane connected boiler tube panels 100.

The new bead sequence that relates to the first pass beginning at the tube 140 crown near the cap 150, an additional pass applied parallel to the tube centerline axis 175 with subsequent beads placed in a progression down the tube wall 165 toward the membrane 160 with the final passes of weld beading being applied on the membrane 160.

In a particular implementation, a first pass of the weld beads is placed on the crown of the tube 140 at a first location 102. A second pass of the weld beading is then placed on the crown of the tube 140 at a location 104 parallel to first location 102 opposite the tube center line axis 175. A third pass of the weld beading is then placed at a subsequent location 106 at the cap 150 of the crown of the boiler tube 140.

Another weld beading is then placed on the tube 140 at a location 108 adjacent to the first location 102 of the weld bead placement. Then weld beads are placed alternately at a location 110 on the opposite side of the tube parallel to the tube centerline axis 175. The weld bead sequence will continue down the wall of the tube 160 at various locations, first applying weld beads at locations 112, 114, then at locations 116, 118, and then at locations 120, 122, respectively, so that the weld overlay reaches the membrane to tube wall interface 180. Final passes of weld beads are then placed on the membrane at locations 124, 126 on one side of the tube and then on the membrane on the alternate side of the tube at locations 128, 130.

In conventional bead sequencing methods, the bead sequence would begin with placement of weld beads starting at the membrane and tube wall interface 180, continuing with alternating with weld bead placement paralleling the tube centerline axis 175, continue on each side of the tube 140 on the membranes and progress up the tube wall 165. A final weld bead pass would conclude at the cap 150 of the crown.

In one embodiment, the bead sequence of the present invention and illustrated in FIG. 1 creates less tubular ovality, consequently producing less panel width shrinkage as compared to the old sequence. This is primarily due to the stiffening effects of each prior pass minimizing the transverse, i.e. membrane to membrane, dimensional changes. The reduced distortion in the boiler tube panel is beneficial and makes the product more efficient.

As a result, the weld overlay application has a thickness that is more consistent and uniform across the curved-flat-curved surface of the tube panel 100. Less weld overlay material is utilized reducing costs. FIG. 4 illustrates an example of the present invention that shows the more uniform consistency of thickness achieved using an embodiment of the present invention. Such consistency of thickness acts to eliminate "stress risers" that become present in thick-to-thin transitions. As demonstrated in FIG. 4, use of the present invention results in a transition that produces a more uniform weld thickness across the entire surface of the tube panel.

In another embodiment, data is provided from numerical analysis indicating the stress-induced changes on the geometry of the tube in a tube panel when overlay is applied with the conventional method compared to one embodiment of the present invention FIGS. 5-6 illustrate the dimensional change of the tube within the plane of the membranes For example, in FIG. 5 (conventional process), the predicted inside diameter of the tubing continues to shrink with each consecutive welding pass. By comparison, in FIG. 6 (one embodiment of the claimed process) the predicted inside diameter of the tubing at later passes (e.g. passes 11 and 12) is highly consistent with the initial inside diameter of the tubing and is a substantially greater diameter than that achieved at later welding passes of the conventional method (see FIG. 5). As can be seen from these Figures, the dimensional change is one method for evaluating the resulting dimensional change in a large panel of boiler tubes. FIGS. 2 and 3 also illustrate the different effect of bead placement and sequence in maintaining the dimensional characteristics, i.e., circularity, of the tube in the panel.

In other embodiments, a similar analytical technique may develop a weld bead placement sequencing method that minimizes the residual and distortion stresses of weld bead placement on any mechanical components that would benefit from a re-surfacing by a weld overlay.

It is understood that the present invention is not limited to the shapes and metal processes illustrated herein. For example, the present invention may be used to investigate stress induced failures to assist in diagnosing fatigue type failures where joint welding and attachment points can be prescribed to avoid future failures.

While the above description contains many particulars, these should not be consider limitations on the scope of the present disclosure, but rather a demonstration of implementations thereof. The method of weld bead sequencing and the associated uses disclosed herein include any combination of the different species or implementations disclosed. Accordingly, it is not intended that the scope of the present disclosure in any way be limited by the above description. The various elements of the claims and claims themselves may be combined in any combination, in accordance with the teachings of the present disclosure, which includes the claims.

The invention claimed is:

1. A method of applying a weld overlay to a boiler tube panel, comprising:
   applying a first weld bead at a crown of a wall of a boiler tube at a first location;
   applying a second weld bead at the crown of the wall of the boiler tube at a second location parallel to the first location on the opposite side of the tube center line axis;
   applying a third weld bead at a cap of the boiler tube,
   applying a plurality of weld beads beginning with applying an additional weld bead next to the first location, alternating parallel to the tube center line axis to apply another weld bead, and continuing to alternate and place additional weld beads when moving down the tube wall to a membrane and tube wall interface, wherein the first weld bead, the second weld bead, the third weld bead, and the plurality of weld beads extend along a longitudinal axis of the tube, the longitudinal axis being perpendicular to a line that passes through a diameter of the tube and the membrane; and
   applying subsequent weld beads on the membrane.

2. The method of claim 1 wherein the weld bead sequence reduces the distortion in the boiler tube panel upon application of a weld overlay.

3. The method of claim 1 wherein the thickness of the weld overlay is substantially uniform across a surface of the boiler tube panel.

4. A method of applying a weld overlay to a boiler tube panel, comprising:
   applying weld beads at a crown of a wall of a boiler tube;
   continuing to apply weld beads down the boiler tube wall, alternating sides at locations parallel to a tube center line axis until reaching a membrane, wherein the weld beads extend along a longitudinal axis of the tube, the longitudinal axis being perpendicular to a line that passes through a diameter of the tube and the membrane; wherein applying weld beads includes applying a weld bead to a cap of the boiler; and
   applying weld beads on the membrane on one side of the tube and than on the membrane on the other side of the tube.

5. The method of claim 4 wherein the weld bead sequence reduces the distortion in the boiler tube panel upon application of a weld overlay.

6. The method of claim 4 wherein the thickness of the weld overlay is uniform and consistent across a surface of the boiler tube panel.

7. The method of claim 6 wherein the mechanical component is a boiler tube panel.

* * * * *